US007211167B1

(12) United States Patent
Whitworth

(10) Patent No.: US 7,211,167 B1
(45) Date of Patent: May 1, 2007

(54) METHOD AND APPARATUS FOR MANUFACTURING INNERSPRING ASSEMBLIES

(75) Inventor: Ian James Whitworth, Derbyshire (GB)

(73) Assignee: Springform Technology Limited, Long Eaton, Nottingham (GB)

( * ) Notice: Subject to any disclaimer, the term of this patent is extended or adjusted under 35 U.S.C. 154(b) by 0 days.

(21) Appl. No.: 09/936,457

(22) PCT Filed: Mar. 13, 2000

(86) PCT No.: PCT/GB00/00917

§ 371 (c)(1), (2), (4) Date: Mar. 12, 2002

(87) PCT Pub. No.: WO00/55088

PCT Pub. Date: Sep. 21, 2000

(30) Foreign Application Priority Data

Mar. 17, 1999 (GB) ................................ 9905964.4

(51) Int. Cl.
*B32B 37/12* (2006.01)

(52) U.S. Cl. ...................... 156/291; 156/539; 156/556; 156/578; 5/716; 5/720; 118/220; 118/225; 118/255; 118/313; 118/315

(58) Field of Classification Search ........ 156/290–291, 156/538–539, 556, 566, 578; 5/716, 720; *B68G 9/00*
See application file for complete search history.

(56) References Cited

U.S. PATENT DOCUMENTS 5,016,305 A * 5/1991 Suenens et al. .............. 5/655.8
5,637,178 A * 6/1997 Suenens et al. ............. 156/297
5,792,309 A * 8/1998 Eto ............................ 156/517
6,143,122 A * 11/2000 Mossbeck et al. .......... 156/291
6,159,319 A * 12/2000 Mossbeck .................. 156/182

FOREIGN PATENT DOCUMENTS

EP 421495 * 4/1991
WO WO 96/07345 * 3/1996
WO WO 97/37569 * 10/1997
WO WO 02/44076 * 6/2002
WO WO 2004/014783 * 2/2004

* cited by examiner

*Primary Examiner*—Jessica Ward
(74) *Attorney, Agent, or Firm*—Nixon Peabody LLP

(57) ABSTRACT

A method for the manufacture of an innerspring assembly, suitable for a mattress, cushion, or the like, is disclosed. In one aspect, the method involves the steps of: positioning a first string of pocketed coil springs in juxtaposition with a plurality of adhesive applicators disposed in mutually fixed relation on an axis parallel to a longitudinal axis of the first string; applying adhesive from the adhesive applicators to the first string of pocketed coil springs; and bringing the first string of pocketed coil springs into adhesive contact with a second string of pocketed coil springs. An apparatus for carrying out the method, and innerspring assemblies produced by the method, are also disclosed.

23 Claims, 3 Drawing Sheets

METHOD AND APPARATUS FOR MANUFACTURING INNERSPRING ASSEMBLIES

CROSS REFERENCE TO RELATED APPLICATIONS

This application is a 35 U.S.C. §371 of PCT/GB00/00917, filed Mar. 13, 2002, and claims priority from U.K. Patent Application No. 9905964.4, filed Mar. 17, 1999, both of which are hereby incorporated by reference in their entirety.

FIELD OF THE INVENTION

This invention relates to a method and apparatus for manufacturing innerspring assemblies, in particular innerspring assemblies for mattresses or the like, said innerspring assemblies comprising chains of pocketed coil springs arranged side by side and adhered together laterally by adhesive.

BACKGROUND OF THE INVENTION

It is well known to assemble innerspring assemblies for mattresses and the like from pocketed coil springs. Typically, chains of pocketed springs are manufactured by feeding the springs direct from a spring coiling machine into the space between two plies of a weldable fabric, the two plies then being sealed together to form a pocket which encapsulates the spring. The fabric is then indexed forward, the next spring encapsulated, and so on. In this way, lengthy chains of pocketed springs are built up. Such chains of pocketed springs are referred to herein as "strings" of springs.

An innerspring assembly of appropriate dimensions for a mattress can then be built up by placing appropriate lengths of pocketed spring chain side by side and adhering them together.

Automated methods for forming innerspring assemblies in this way, and apparatus for carrying out such methods, are known. European Patent No 0154076, for example, discloses a method in which an adhesive applicator is passed over a string of pocketed springs, the applicator being actuated briefly as it passes over each spring so as to apply a line of adhesive to the spring, parallel to the lines defining the transverse sides of the pockets, and then contacting the string of springs against another similar string of springs.

European Patent No 0421495 discloses another method in which a string of pocketed springs is passed longitudinally past a fixed adhesive applicator such that adhesive is applied to one side of the string, which is then pressed into contact with a corresponding side of a second string of springs.

In both of the above methods the amount of adhesive applied to the various springs in each string is substantially the same. This can be a disadvantage in that it results in the innerspring assembly having a uniform degree of firmness along its whole length. Sometimes it is desirable for the firmness of the innerspring assembly to vary along its length. For instance, it is known to manufacture a mattress with three zones of firmness, the central region, which carries the greatest part of the weight of a person lying on the mattress, being relatively stiff, whilst the head and foot parts of the mattress are less stiff for greater comfort. A more sophisticated arrangement is a five zone mattress in which the central part is again the stiffest, but the extreme ends are also somewhat stiffer than the intermediate regions. Such arrangements cannot easily be produced using known innerspring assembly apparatus. Another disadvantage of the known systems is that the need to move the string of springs past a fixed adhesive applicator, or to move an applicator over a string of springs, may slow down the manufacturing process.

There have now been devised a method and apparatus for the manufacture of innerspring assemblies, which overcome or substantially mitigate the above-mentioned or other disadvantages of the prior art.

SUMMARY OF THE INVENTION

According to a first aspect of the invention, there is provided a method for the manufacture of an innerspring assembly, which method comprises the steps of a) positioning a first string of pocketed coil springs in juxtaposition with a plurality of adhesive applicators disposed in mutually fixed relation on an axis parallel to a longitudinal axis of said first string, b) applying adhesive from said adhesive applicators to said first string of pocketed coil springs, and c) bringing said first string into adhesive contact with a second string of pocketed coil springs.

The method according to the invention is advantageous primarily in that, because a plurality of adhesive applicators are used, the amount and/or distribution of adhesive applied to each individual pocket may be varied, thereby enabling control of the firmness of regions of the innerspring assembly, and hence of the finished mattress. Also, because the adhesive may be applied simultaneously from the adhesive applicators to all the pockets of the first string (rather than being applied to the pockets sequentially), an increase in operating speed and throughput may be achieved. Also, where the adhesive applicators are actuated simultaneously, the length of time between dispensing of the adhesive and contacting of the first and second may be minimised and is also the same for all parts of the strings, leading to improved and more consistent adhesion.

The invention also provides an innerspring assembly manufactured by the method of the first aspect of the invention.

According to another aspect of the invention, there is provided apparatus for use in the manufacture of an innerspring assembly, which apparatus comprises a plurality of adhesive applicators, means for positioning a first string of pocketed coil springs in juxtaposition with said plurality of adhesive applicators, and means for bringing said first string into adhesive contact with a second string of pocketed coil springs, wherein said plurality of adhesive applicators are disposed in mutually fixed relation on an axis parallel to a longitudinal axis of said first string.

For most applications, adhesive is preferably dispensed from the plurality of adhesive applicators simultaneously or substantially simultaneously.

Preferably, the first string of pocketed coil springs is fed longitudinally to the apparatus of the invention and then displaced transversely into juxtaposition with the adhesive applicators. Most preferably, the adhesive applicators are arranged in a line and are disposed above the path of transverse movement of the first string. Each applicator will generally have a downwardly directed outlet for adhesive (which will normally be in the form of a liquid), normally in the form of a nozzle. For some applications, each applicator may be provided with more than one outlet, eg a number of nozzles arranged in a row transverse or parallel to the longitudinal axis of the first string, or a single nozzle with more than one orifice arranged to dispense adhesive in different directions.

The first string may be manufactured by conventional techniques, eg by inserting the springs in compressed condition between the plies of a folded sheet of ultrasonically weldable fabric and forming closed compartments for each spring by making a series of welds.

Following application of the adhesive to the first string, the first string is preferably displaced onto a turning mechanism by which the first string is tipped into an upright position such that the surface of the first string to which adhesive has been applied is brought into contact with the surface of the second string. The second string will most commonly be a string which has immediately beforehand been processed in the same manner as the first string. The turning mechanism most preferably comprises a plate disposed parallel to the adhesive applicators. The plate preferably has a width corresponding approximately to the width of the first string and pivots about its major edge which is remote from the adhesive applicators. When the first string is displaced onto the plate, the plate can thus be pivoted to tip the first string away from the adhesive applicators and into contact with the second string. The turning mechanism is most preferably provided with means for retaining the string of springs in position during the turning operation. Such means conveniently comprises one or more electromagnets which are activated when the string of springs has been displaced onto the turning plate and are switched off once the first string is pressed into contact with the second string.

The various movements of the first string, ie into alignment with the adhesive applicators, transversely beneath the adhesive applicators, and onto the turning plate, are most conveniently brought about by suitable mechanical means, eg using electric, hydraulic or pneumatic power. Suitable sensors are preferably provided to monitor and control the various movements, in generally conventional fashion.

The adhesive which is applied to the first string may be one of those adhesives which are conventionally used in the manufacture of innerspring assemblies. Hot melt adhesives are particularly suitable. In general, any conventional adhesive having the desired properties (eg strong adhesion, good flow properties, and lack of odour) may be used.

For many applications adhesive will be dispensed from the adhesive applicators with those applicators in fixed, stationary positions relative to the string of springs. In other cases, however, adhesive may be dispensed whilst controlled movement of the applicators relative to the string of springs is taking place. This may be necessary or desirable, for example to achieve a particular (eg elongated) distribution of adhesive on the surface of some or all of the pockets. Obviously, such an effect may be achieved either by moving the applicators relative to a stationary string of springs, or (as may be more convenient) displacing the string of springs relative to fixed applicators.

It may also be desirable for the separation of the adhesive applicators from the string of springs to be adjustable, eg to vary the size of the area to which adhesive is applied. Such an arrangement also allows spring pockets of different diameters to be accommodated.

As explained above, the present invention enables the manufacture of innerspring assemblies which are "zoned", ie which have portions of differing firmness. Thus, according to a further aspect of the invention, there is provided an innerspring assembly which comprises strings of pocketed coil springs, said strings being joined by adhesive applied to abutting surfaces of the pockets of adjacent strings, wherein the quantity and/or distribution of adhesive applied to the pockets of adjoining strings is non-uniform. Such an innerspring assembly may comprise at least one portion in which adjacent strings are connected by relatively high quantities of adhesive applied to the pockets of those strings, and at least one portion in which adjacent strings are connected by relatively low quantities of adhesive applied to the pockets of those strings.

It will be understood that, although reference is made above principally to innerspring assemblies for use in mattresses, the same methods and apparatus may be used in the manufacture of innerspring assemblies for cushions and the like.

BRIEF DESCRIPTION OF THE DRAWINGS

The invention will now be described in greater detail, by way of illustration only, with reference to the accompanying drawings, in which.

DETAILED DESCRIPTION OF THE INVENTION

Figure 1:
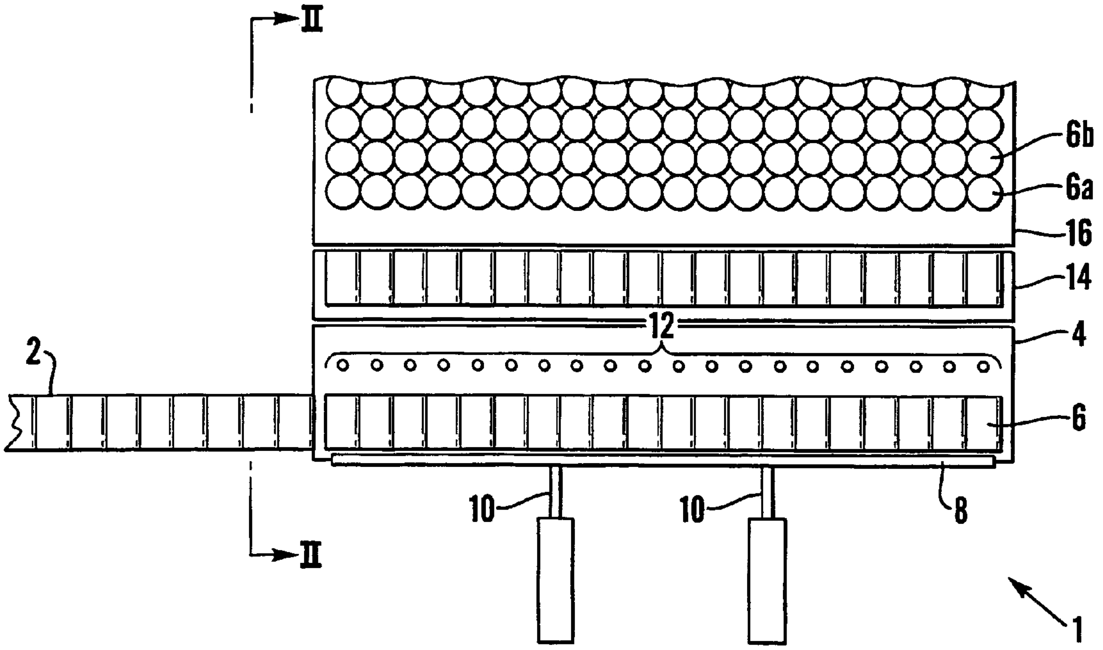
FIG. 1 is a schematic plan view of apparatus in accordance with the invention.
Figure 2:
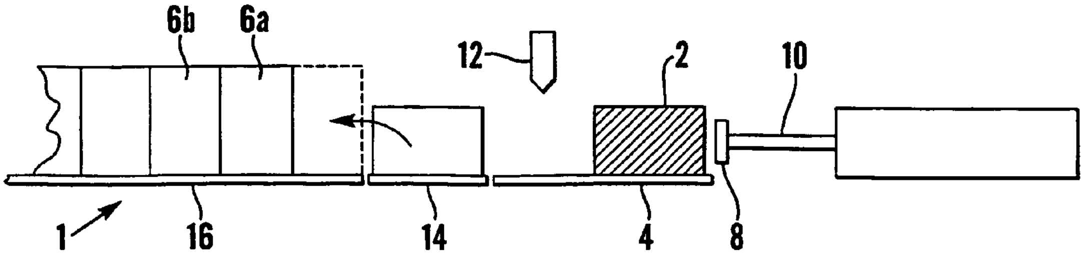
FIG. 2 is a view on the line II—II in FIG. 1.

Referring first to FIGS. 1 and 2, apparatus for the manufacture of an innerspring assembly is generally designated 1. The apparatus 1 is fed with a continuous chain 2 of pocketed coil springs which may be manufactured by conventional techniques.

A string 6 of pocketed springs is cut to a suitable length by conventional cutting means (not shown) from the leading portion of the chain 2. The string 6 is transported longitudinally onto a bed 4 by a suitable conveyor means (also not shown). In the example illustrated, the string 6 has a length of twenty pocketed springs, this length corresponding to the length of the finished innerspring assembly.

Figure 3:
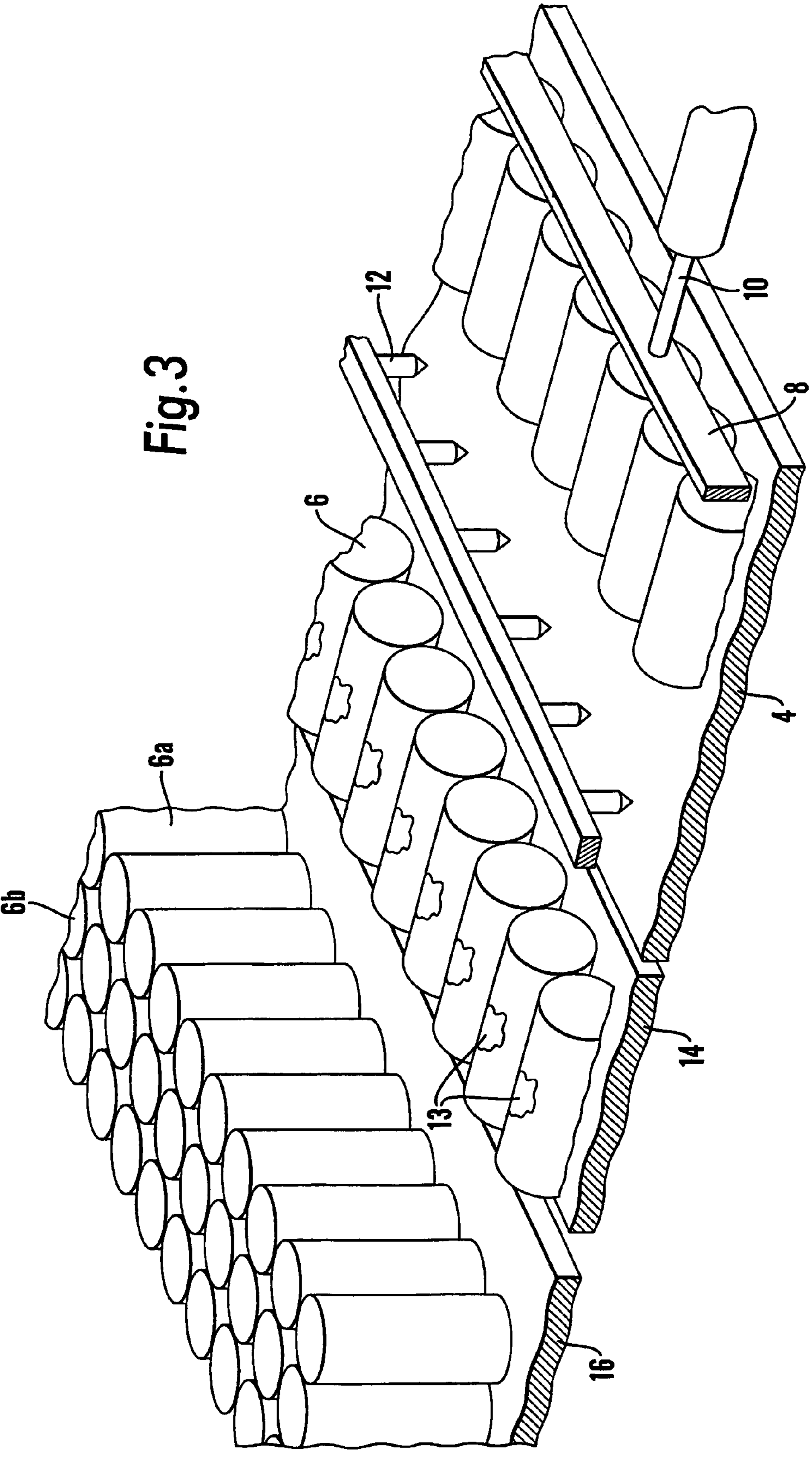
FIG. 3 is a fragmentary perspective schematic view illustrating stages in the carrying out of the invention.

Once the leading string 6 has been deposited on the bed 4, the conveyor means halts temporarily. The string 6 is then driven laterally across the bed 4 by a transport plate 8 which in the illustrated embodiment is actuated by a pair of pneumatic rams 10. For increased precision it may be preferable for the transport plate 8 to be driven by a servo motor. A row of twenty adhesive guns 12 are disposed above the path of the string 6 and are actuated as the string 6 passes beneath them, so as to deposit a quantity of hot melt adhesive on the upwardly facing surface of each pocket in the string 6. This may be achieved by brief actuation of the adhesive guns 12 whilst the string 6 is in motion beneath the guns 12. Alternatively, movement of the string 6 beneath the guns 12 may be halted temporarily whilst the guns 12 are actuated. It will be appreciated that by appropriate control of the movement of the string 6 and actuation of the guns 12, a variety of different patterns of adhesive may be applied to the surface of the pockets making up the string 6. For instance, the adhesive may be applied as a single, generally circular spot 13 (as shown in FIG. 3), or as a series of spots disposed longitudinally along the pocket (or otherwise, as described below), or a continuous line of adhesive may be applied along the pocket. Similarly, it is possible for all the guns 12 to be actuated so that adhesive is applied to all the pockets, or for only some of the guns 12 to be actuated.

After application of the adhesive, the string 6 is transported further, in the same direction, by the transport plate 8, onto a turning table 14. The turning table 14 rotates through 90°, thereby tipping the string 6 into an upright position and pressing the surface of the string 6 to which adhesive has been applied into contact with the corresponding surface of a previously processed string 6*a* which rests on a main bed 16. Electromagnets (not shown) fitted beneath the turning table 14 hold the string 6 in place during the tipping operation. While the string 6 is being turned, the pneumatic rams 10 withdraw the transport plate 8 to its starting position (as shown in FIGS. 1 and 2) and the next string is conveyed onto the bed 4. The next string is then processed in the same manner as the preceding string 6. In this manner, the completed innerspring construction is built up from successive strings 6, 6*a*, 6*b* etc.

Figure 4:
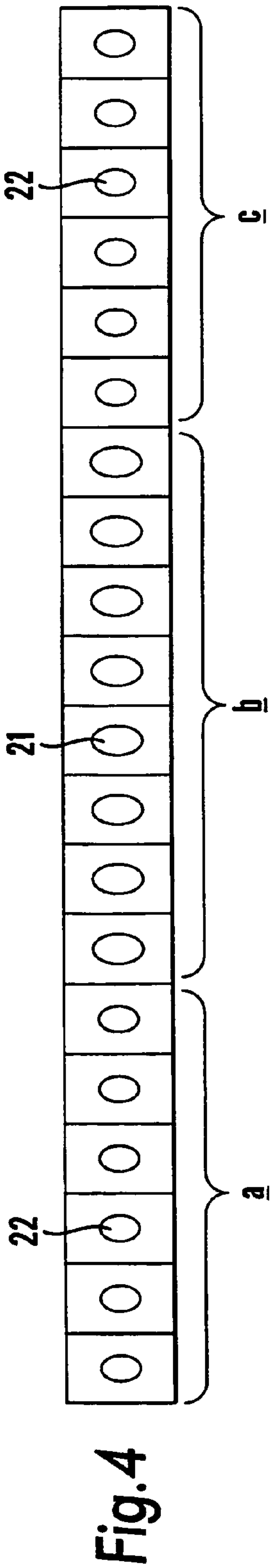
FIG. 4 is a schematic view of a string of pocketed springs for use in the manufacture of a "3-zone" mattress.

The degree of adhesion between adjacent pockets in successive strings in the assembled innerspring assembly determines the degree of firmness of that part of the innerspring assembly, and hence of that part of a mattress in which the innerspring assembly is used. It is thus possible to control the firmness of the mattress by appropriate application of adhesive to the respective pockets. FIG. 4 shows a pattern of adhesive application appropriate for a so-called "3-zone" mattress. In such a construction, the head and foot parts of the mattress are relatively soft, while the central region of the mattress is relatively firm. To achieve such a result, adhesive is applied to a larger area 21 of the pockets in the central part b of each string, as compared with the area 22 of the adhesive applied to the pockets at the two end portions a,c of the string.

Figure 5:
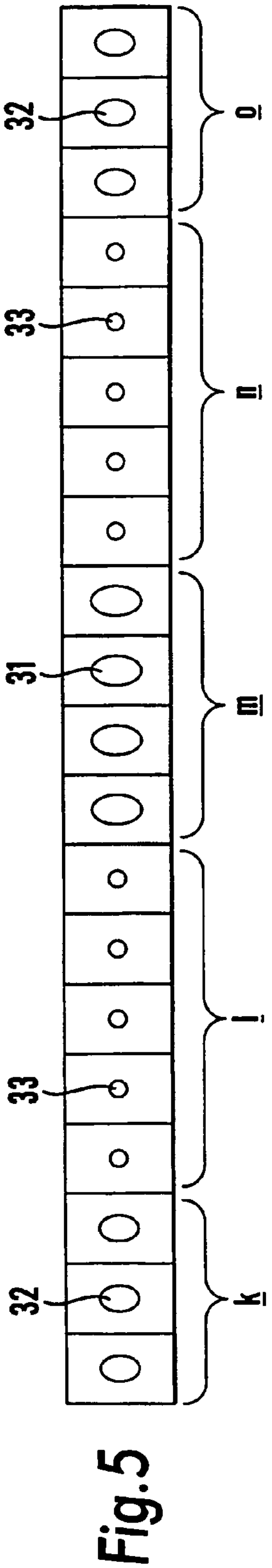
FIG. 5 is a view similar to FIG. 4, but of a string of pocketed springs for use in the manufacture of a mattress having a "5-zone" construction.

FIG. 5 shows a somewhat more complex pattern of adhesive application, suitable for the formation of a "5-zone" mattress. In such a mattress, the central region m is again the firmest (adhesive being applied to the largest area 31), but in this case the extreme head and foot parts k,o are of intermediate firmness (adhesive area 32), being separated from the central region k by relatively soft regions l,n (smallest adhesive regions 33).

Figure 6:
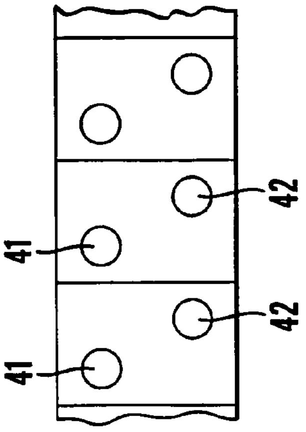
FIG. 6 is a side view of pocketed springs showing a mode of application of adhesive suitable for assembly of a mattress having a nested spring configuration.
Figure 7:
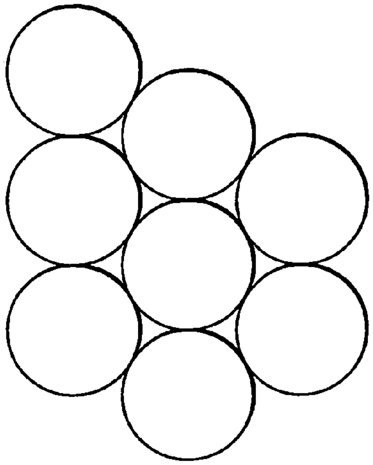
FIG. 7 is a plan view of a nested innerspring assembly.

The patterns of adhesive application shown in FIGS. 4 and 5 are appropriate for innerspring assemblies in which the spring pockets are arranged with their centres in a square array, ie in which the pockets are arranged in regular longitudinal and transverse rows. Another arrangement which is sometimes used is a so-called nested arrangement, in which the spring pockets are arranged in an hexagonal array. Such an array is shown in FIG. 7. Because, in the formation of such an array, it is not the central part of each spring pocket which is pressed against the pockets of the previous string, but rather surfaces of the pocket which are offset from the centre line, the adhesive application pattern shown in FIG. 6 is more appropriate. This pattern consists of two circular areas of adhesive 41,42 applied to each pocket, the two areas 41,42 being spaced apart along, and offset from, the longitudinal axis of each pocket. A pattern of this form may be created by applying adhesive first to the areas 41, with the adhesive guns 12 offset from the centre lines of the pockets, and then moving the adhesive guns 12 to a second position, offset in the other direction, and applying adhesive then to the second areas 42. The separation of the two areas 41,42 along the centre lines of the pockets is brought about by the movement of the string towards the turning table between the two applications of adhesive.

Clearly, in order to enable the two areas of adhesive to be applied on opposite sides of the centre line of each pocket it is necessary for there to be means for displacing the adhesive guns 12 relative to the string. There may therefore be provided means for moving the guns 12 as a unit, or for displacing the string a short distance along its longitudinal axis relative to fixed guns. In a further alternative, a pattern such as that shown in FIG. 6 could be produced using two rows of adhesive guns, both arranged on axes parallel to the longitudinal axis of the string but offset from one another such that the guns of one row deposit adhesive to one side of the pocket centre lines (say the first areas 41) and the other row of guns deposit adhesive to the other side (ie to the second areas 42).

It will also be appreciated that patterns of adhesive may also be produced by the method of the invention in which adhesive is applied to two (or more) areas on the centre line of some or each of the pockets. Such areas of adhesive may be discrete, or they may overlap or merge to form single, larger areas.

The invention claimed is:

1. A method for the manufacture of an innerspring assembly, which method comprises the steps of:

a) positioning a first string of pocketed coil springs in juxtaposition with a plurality of adhesive applicators, said adhesive applicators being disposed in mutually fixed relation on an axis parallel to a longitudinal axis of said first string so as to define a row of adhesive applicators that extends along the full extent of the first string, b) applying adhesive from said adhesive applicators to pockets of said first string of pocketed coil springs, and c) bringing said first string into adhesive contact with a second string of pocketed coil springs.

2. A method as claimed in claim 1, wherein adhesive is applied from said plurality of adhesive applicators simultaneously or substantially simultaneously.

3. A method as claimed in claim 1, wherein the first string of pocketed coil springs is positioned into juxtaposition with the adhesive applicators, by being fed longitudinally along, and then displaced transversely from, an axis parallel to said longitudinal axis of the first string.

4. A method as claimed in claim 1, wherein following application of the adhesive to the first string, the first string is tipped into an upright position such that the surface of the first string to which adhesive has been applied is brought into contact with the surface of the second string.

5. A method as claimed in claim 1, wherein the second string has immediately beforehand been processed in the same manner as the first string.

6. A method as claimed in claim 1, wherein movements of the first string are brought about by suitable mechanical means, using electrical, hydraulic or pneumatic power.

7. A method as claimed in claim 1, wherein the adhesive which is applied to the first string is a hot melt adhesive.

8. A method as claimed in claim 1, wherein adhesive is dispensed from the adhesive applicators with those applicators in fixed, stationary positions relative to the first string.

9. A method as claimed in claim 1, wherein adhesive is dispensed from the adhesive applicators whilst movement of the first string relative to the applicators is taking place.

10. A method for the manufacture of an innerspring assembly as claimed in claim 1, wherein the amount and/or distribution of adhesive applied to each individual pocket is varied relative to the amount and/or distribution of adhesive applied to other pockets.

11. A method as claimed in claim 1, wherein adhesive is dispensed from the adhesive applicators whilst movement of the applicators relative to the first string is taking place.

12. A method as claimed in claim 11, wherein the first string is stationary and the applicators are moved.

13. A method for the manufacture of an innerspring assembly, which method comprises the steps of:

a) positioning a first string of pocketed coil springs in juxtaposition with a plurality of adhesive applicators, said adhesive applicators being disposed in mutually fixed relation on an axis parallel to a longitudinal axis of said first string so as to define a row of adhesive applicators that extends along the full extent of the first string, b) applying adhesive from said adhesive applicators to pockets of said first string of pocketed coil springs, wherein the amount and/or distribution of adhesive applied to each individual pocket is varied relative to the amount and/or distribution of adhesive applied to other pockets, and c) bringing said first string into adhesive contact with a second string of pocketed coil springs, such that the innerspring assembly comprises at least one region in which adjacent pockets of the first and second strings are connected by first quantities of adhesive, and at least one region in which adjacent pockets of the first and second strings are connected by second quantities of adhesive, said second quantities of adhesive being less than said first quantities of adhesive.

14. A method as claimed in claim 13, wherein adhesive is applied from said plurality of adhesive applicators simultaneously or substantially simultaneously.

15. A method as claimed in claim 13, wherein the first string of pocketed coil springs is positioned into juxtaposition with the adhesive applicators, by being fed longitudinally along, and then displaced transversely from, an axis parallel to said longitudinal axis of the first string.

16. A method as claimed in claim 13, wherein following application of the adhesive to the first string, the first string is tipped into an upright position such that the surface of the first string to which adhesive has been applied is brought into contact with the surface of the second string.

17. A method as claimed in claim 13, wherein the second string has immediately beforehand been processed in the same manner as the first string.

18. A method as claimed in claim 13, wherein movements of the first string are brought about by suitable mechanical means, using electrical, hydraulic or pneumatic power.

19. A method as claimed in claim 13, wherein the adhesive which is applied to the first string is a hot melt adhesive.

20. A method as claimed in claim 13, wherein adhesive is dispensed from the adhesive applicators with those applicators in fixed, stationary positions relative to the first string.

21. A method as claimed in claim 13, wherein adhesive is dispensed from the adhesive applicators whilst movement of the first string relative to the applicators is taking place.

22. A method as claimed in claim 13, wherein adhesive is dispensed from the adhesive applicators whilst movement of the applicators relative to the first string is taking place.

23. A method as claimed in claim 22, wherein the first string is stationary and the applicators are moved.

* * * * *